(12) United States Patent
Xia et al.

(10) Patent No.: US 10,152,277 B2
(45) Date of Patent: Dec. 11, 2018

(54) DATA TRANSMISSION METHOD AND SYSTEM

(71) Applicant: BEIJING BAIDU NETCOM SCIENCE AND TECHNOLOGY CO., LTD., Haidian District Beijing (CN)

(72) Inventors: Liming Xia, Haidian District Beijing (CN); Jingchao Feng, Haidian District Beijing (CN); Quan Wang, Haidian District Beijing (CN); Ning Qu, Haidian District Beijing (CN); Zhuo Chen, Haidian District Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 106 days.

(21) Appl. No.: 15/281,268

(22) Filed: Sep. 30, 2016

(65) Prior Publication Data

US 2017/0371591 A1    Dec. 28, 2017

(30) Foreign Application Priority Data

Jun. 24, 2016  (CN) .......................... 2016 1 0473409

(51) Int. Cl.
*G06F 3/06* (2006.01)
*H04L 12/801* (2013.01)
*G05D 1/02* (2006.01)

(52) U.S. Cl.
CPC .......... *G06F 3/0659* (2013.01); *G06F 3/0604* (2013.01); *G06F 3/064* (2013.01);
(Continued)

(58) Field of Classification Search
CPC ......... H04L 12/5693; H04L 2012/5681; H04L 47/50; H04L 49/90; H04L 49/309;
(Continued)

(56) References Cited

U.S. PATENT DOCUMENTS 5,867,656 A * 2/1999 Iwasaki .................. G06F 9/544
                                                    709/201
8,606,314 B2 * 12/2013 Barnes, Jr. ......... G06Q 10/1053
                                                    370/338

(Continued)

FOREIGN PATENT DOCUMENTS

CN    103197979 A    7/2013
CN    104346227 A    2/2015

*Primary Examiner* — Dady Chery
(74) *Attorney, Agent, or Firm* — Miller, Matthias & Hull LLP

(57) ABSTRACT

The present application discloses a data transmission method and system. A specific embodiment of the method includes: receiving a data transmission-instruction by a data sender, wherein the data transmission-instruction includes a thematic name indicative of a type of to-be-transmitted data required by a data receiver; creating a shared memory segment corresponding to the thematic name. It makes possible for the data sender and the data receiver to run in a separate memory space. When data is needed to be transmitted, a corresponding shared memory segment may be created for data transmission in accordance with any transmitting requirement, and the shared memory segment may be released when the transmission is done or appears abnormal. On one hand, it reduces the redundant operations of the data transmission system during data transmission, and improves the data transmission performance; on the other hand, the data transmitting procedure between the data sender and the data receiver, and other operations executed by the data sender or the data receiver are independent of each other, which improves the stability of the data transmission system.

13 Claims, 4 Drawing Sheets

(52) U.S. Cl.
CPC .............. *G06F 3/067* (2013.01); *H04L 47/10* (2013.01); *G05D 1/0246* (2013.01)

(58) Field of Classification Search
CPC .............. H04L 49/901; H04L 49/9094; H04L 2012/5651; H04L 2012/5679; H04L 47/24; H04L 47/2433; H04L 47/625; H04L 47/805
See application file for complete search history.

(56) References Cited

U.S. PATENT DOCUMENTS

| | | | |
|---|---|---|---|
| 8,898,399 B2* | 11/2014 | Leshchiner | G06F 9/544 709/213 |
| 2004/0034869 A1* | 2/2004 | Wallace | G11B 27/034 725/45 |
| 2008/0027895 A1* | 1/2008 | Combaz | G06F 17/30699 |
| 2016/0036945 A1* | 2/2016 | Pajarinen | H04N 21/2265 375/240 |

* cited by examiner

DATA TRANSMISSION METHOD AND SYSTEM

CROSS-REFERENCE TO RELATED APPLICATION

This application is related to and claims priority from Chinese Application No. 201610473409.4 filed on Jun. 24, 2016, entitled "DATA TRANSMISSION METHOD AND SYSTEM", the entire disclosure of which is hereby incorporated by reference.

TECHNICAL FIELD

The present disclosure relates to a field of computer technology, particularly to the field of data transmission, and more particularly to a data transmission method and system.

BACKGROUND

When operating a system (e.g. an auto-driving control system), ensuring an on-going highly efficient, safe communication between processes is of paramount importance to ensure the stability and security of the system. Currently, a commonly available communication mode with multiprocess includes: 1) a message communication mechanism based on a socket connection; and 2) a pointer communication mechanism based on multiple processes.

However, for the message communication mechanism based on a socket connection, data processing before transmission, memory copying and pass message loss and retransmission during the transmission will result in high delay, low throughput and high CPU load, which in turn will not meet a high real-time demand of, for example, the auto-driving control system. For the pointer communication mechanism based on multiple processes, it is required to load a sending program node or a receiving program node in a form of process, which are stored in separate memory spaces, into a same process. Accordingly, the message is sent in a form of pointer, and interactions and managements between multiple processes would cause unpredictable risks to system stability, and moreover, the isolation and individual management of sources may not be implemented.

SUMMARY

The present application provides a data transmission method and system in order to solve the technical problem mentioned in the foregoing Background section.

In a first aspect, the present application provides a data transmission method, which comprises: receiving a data transmission-instruction by a data sender, wherein the data transmission-instruction includes a thematic name indicative of the type of to-be-transmitted data required by a data receiver; creating a shared memory segment corresponding to the thematic name so that the data sender and the data receiver may transmit the to-be-transmitted data by using the shared memory segment.

In a second aspect, the present application provides a data transmission system, which comprises a data sender and a data receiver, wherein the data sender is used for: receiving a data transmission-instruction including a thematic name indicative of the type of to-be-transmitted data required by a data receiver; creating a shared memory segment corresponding to the thematic name so that the data sender and the data receiver may transmit the to-be-transmitted data by using the shared memory segment.

According to the data transmission method and system provided in the present application, the data transmission-instruction including the thematic name indicative of the type of to-be-transmitted required by the data receiver is received by a data sender, and the shared memory segment corresponding to the thematic name is created so that the data sender and the data receiver may transmit the to-be-transmitted data by using the shared memory segment, and thus the data transmission method and system make it possible for the data sender and the data receiver to run in a separate memory space. In addition, when the data is needed to be transmitted, the corresponding shared memory segment may be created for data transmission in accordance with any transmitting requirement, and the shared memory segment may be released when the transmission is done or appears abnormal. On one hand, it reduces the redundant operations of the data transmission system during data transmission, and improves the data transmission performance, on the other hand, the data transmitting procedure between the data sender and the data receiver, and other operations executed by the data sender or the data receiver are independent of each other, which improves the stability of the data transmission system.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
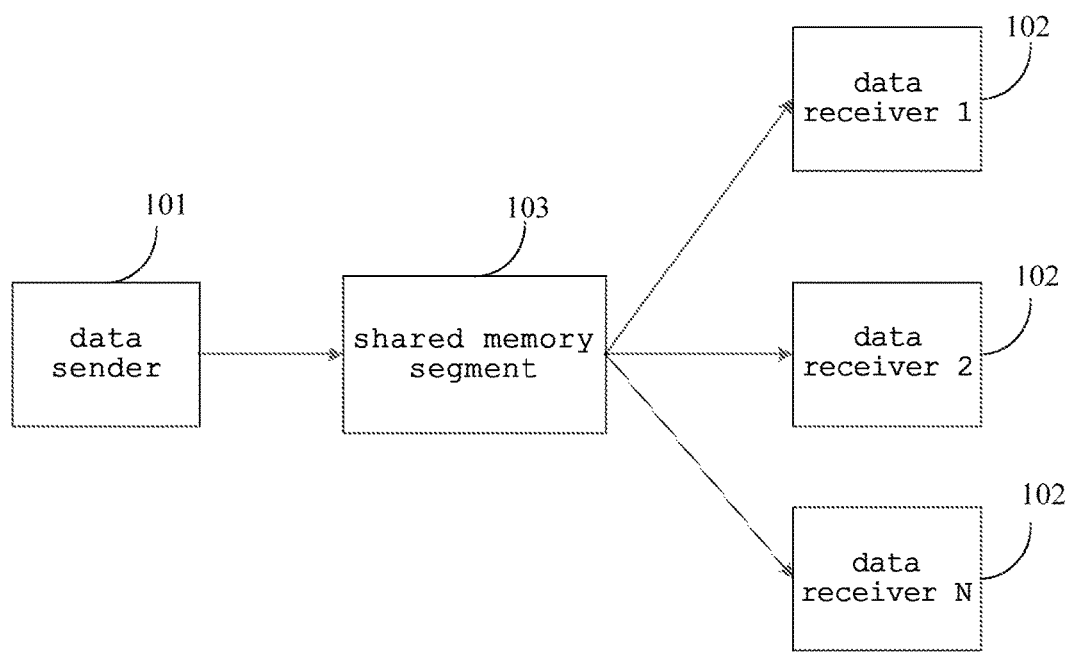
FIG. 1 illustrates an exemplary architecture, which may be applied to a data transmission method or a data transmission system of the present application.

FIG. 1 illustrates exemplary architecture 100, which may be applied to a data transmission method or a data transmission system of the present application.

As shown in FIG. 1, the system architecture 100 may include a data sender 101, a plurality of data receivers 102 and a shared memory segment 103. The data sender 101 may transmit data to the data receiver 102 through the shared memory segment 103. The data sender 101 and the data receiver 102 may be implemented as a process running in the same system. Take the auto-driving vehicle control system as an example, the data sender 101 may be used for collecting data. For example, the data sender may be implemented with a sensor processing program. The data receiver 102 may be used for processing data. For example, the data receiver may be implemented with a decision-making and control program.

Figure 2:
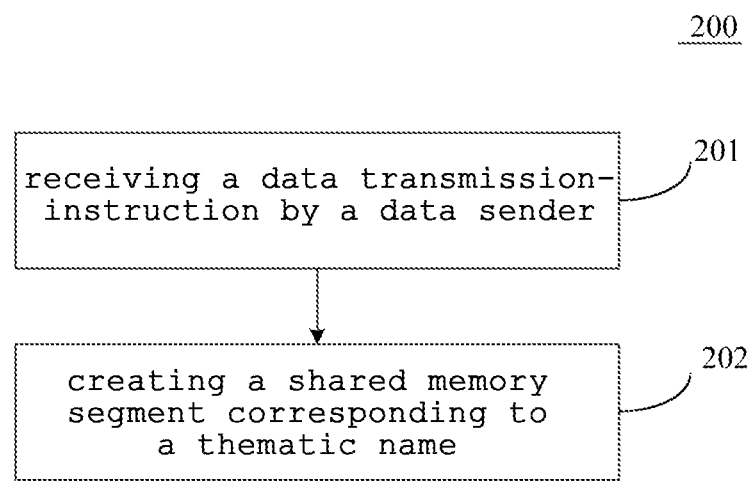
FIG. 2 illustrates a flowchart of a data transmission method according to an embodiment of the present application.

Referring to FIG. 2, a process 200 of a data transmission method according to an embodiment of the present application is shown. The method includes the following steps.

A data sender receives a data transmission-instruction at step 201.

In the present embodiment, the data transmission-instruction includes a thematic name for indicating the type of to-be-transmitted data required by the data receiver. The data sender may be a data sending process, and the data receiver may be a data receiving process.

The scenario in which the data sender and the data receiver may be two processes in the auto-driving control system is taken as an example, wherein one process is a data sending process for collecting, through a camera, a traffic image of the road on which the auto-driving vehicle is currently driving, and the other process is a data receiving process for analyzing the traffic image so as to recognize obstacles. The data sending process may provide the collected traffic image, and the data receiving process needs to receive and analyze the traffic images collected by the data sending process so as to recognize obstacles. The type of to-be-transmitted data between the data sending process and the data receiving process, namely the traffic image, is refereed as a thematic name.

In some optional implementations of the present embodiment, the method further includes: a main process receives an issuance request including a thematic name and sent by the data sending process; and the thematic name and the identity of a data sending process are stored correspondingly.

In some optional implementations of the present embodiment, the method further includes: receiving, by a main process, a subscription request sent by the data receiving process, wherein the subscription request includes a thematic name; storing the thematic name and the identity of the data receiving process correspondingly; establishing a corresponding relationship between the data sending process and the data receiving process; and sending a data transmitting instruction including the thematic name to the data sending process.

In the present embodiment, the data sending process may issue a thematic name, and the data receiving process may subscribe for the thematic name issued by the data sending process. In the present embodiment, the main process may be presetted. The main process may receive an issuance request including the thematic name from the data sending process when the data sending process needs to issue the thematic name. The main process may store the thematic name and an identity of the data sending process correspondingly, and finish the issuance of the thematic name. When the data receiving process needs the data, a type of which corresponds to the thematic name, a subscription request including the thematic name may be sent to the main process. The main process may determine, according to the thematic name in the subscription request, the data that the data receiving process needs and the type of which corresponds to the thematic name. The main process may store the thematic name and the identity of data receiving process correspondingly, so as to accomplish the subscription of the thematic name. The corresponding relationship between the data sending process that issues the thematic name, and the data receiving process that subscribes the thematic name, may be established by the main process.

Take the scenario where both the data sending process and the data receiving process are processes in an auto-driving system as an example, the data sending process may be used for collecting, through a camera, the traffic image of the road on which the auto-driving vehicle is currently driving, and the data receiving process may be used for analyzing the traffic image to recognize the obstacles. The thematic name between the data sending process and the data receiving process may be the type of the to-be-transmitted data, namely, the traffic image. The data sending process may issue this thematic name. The data receiving process may subscribe this thematic name when it needs to analyze the traffic image collected by the camera to recognize the obstacles.

In the present embodiment, the main process may send a data transmission-instruction including the thematic name to the data sending process after establishing a corresponding relationship between a data sending process that issues the thematic name, and a data receiving process that subscribes the thematic name, which may in turn trigger the data sending process to create a shared memory segment to transmit data, the type of which corresponds to the thematic name, between the data sending process and the data receiving process.

The shared memory segment corresponding to the thematic name is created at step 202.

In the present embodiment, after the data receiving process receives the data transmission-instruction inputted in step 201, a shared memory segment corresponding to the thematic name is created according to the thematic name in the transmitting request so that the data sender and data receiver may transmit the to-be-transmitted data by using the shared memory segment corresponding to the thematic name. For example, in the Linux operating system, it may call an interface for creating a shared memory segment provided by the Linux operating system to create a shared memory segment. In the present embodiment, the thematic name and the identity of the shared memory segment can be stored correspondingly so that each thematic name may correspond to one shared memory segment.

In the present embodiment, there may be a plurality of data senders and a plurality of data receivers, which communicate the data through the shared memory segments. The plurality of data senders and the plurality of data receivers may correspond to one thematic name. The plurality of data senders may write the to-be-transmitted data into the shared memory segment corresponding to the thematic name, and the plurality of data receivers may read the data out from the shared memory segment corresponding to the thematic name.

In some optional implementations of the present embodiment, the method further includes: the data sending process and the data receiving process may memory-map the shared memory segment in their respective storage space.

In the present embodiment, in which the data sender is implemented as a data sending process and the data receiver is implemented as a data receiving process, the data sending process and the data receiving process may memory-map, in their respective storage space, the shared memory segment corresponding to the thematic name for transmitting data between the data sending process and the data receiving process, after the shared memory segment is created. Accordingly, after the memory-mapping is done, the data sending/receiving process may write/read the data into/from the shared memory segment.

In some optional implementations of the present embodiment, the method may further include: the data sending process writes the to-be-transmitted data into the shared memory segment by calling a presetted operation interface of the shared memory segment, and the data receiving process reads the to-be-transmitted data from the shared memory segment by calling the presetted operation interface.

In the present embodiment, the operation interface of the shared memory segment may be presetted for each data sending process and each data receiving process. The presetted operation interface may be imbedded into the data sending process and the data receiving process in a form of plug-in, respectively. Accordingly, when the data sending process or the data receiving process needs to transmit the data by using the shared memory segment, they may call the operation interface to write/read the to-be-transmitted data into/from the shared memory segment corresponding to the thematic name.

In some optional implementations of the present embodiment, the method may further include: detecting whether the transmission of the to-be-transmitted data between the data sending process and the data receiving process is done or appears abnormal; if so, sending a releasing instruction to the data sending process and the data receiving process so that the data sending process and the data receiving process release the shared memory segment corresponding to the thematic name.

In the present embodiment, when the data sending process and the data receiving process transmit data through the shared memory segment, it is possible to detect whether the transmission of the to-be-transmitted data between the data sending process and the data receiving process is done or appears abnormal. When it is detected that the transmission of the data is done or appears abnormal, the data sending process and the data receiving process may release the shared memory segment corresponding to the thematic name, i.e., to remove the mapping relationship between the shared memory segment and the storage space for the data sending process and the data receiving process.

In the present embodiment, each process may be referred as a program node. The data sending process may be referred as a sending program node, and the data receiving process may be referred as a receiving program node. The sending program node and the receiving program node transmit data through the shared memory segment corresponding to the thematic name so that it is not necessary for the program node to pre-process the data or to redundantly copy the data in the memory when transmitting data between the sending program node and the receiving program node. Also, a separate running container is provided for each program node, and thus the data may be transmitted based on the efficient message communication mechanism without increasing the hardware resources in the system. Accordingly, the data transmission among all the program nodes is more efficient and reliable, and then the communication time-delay between processes in the system (such as the auto-driving vehicle control system) will be reduced and the system load will be released.

Figure 3:
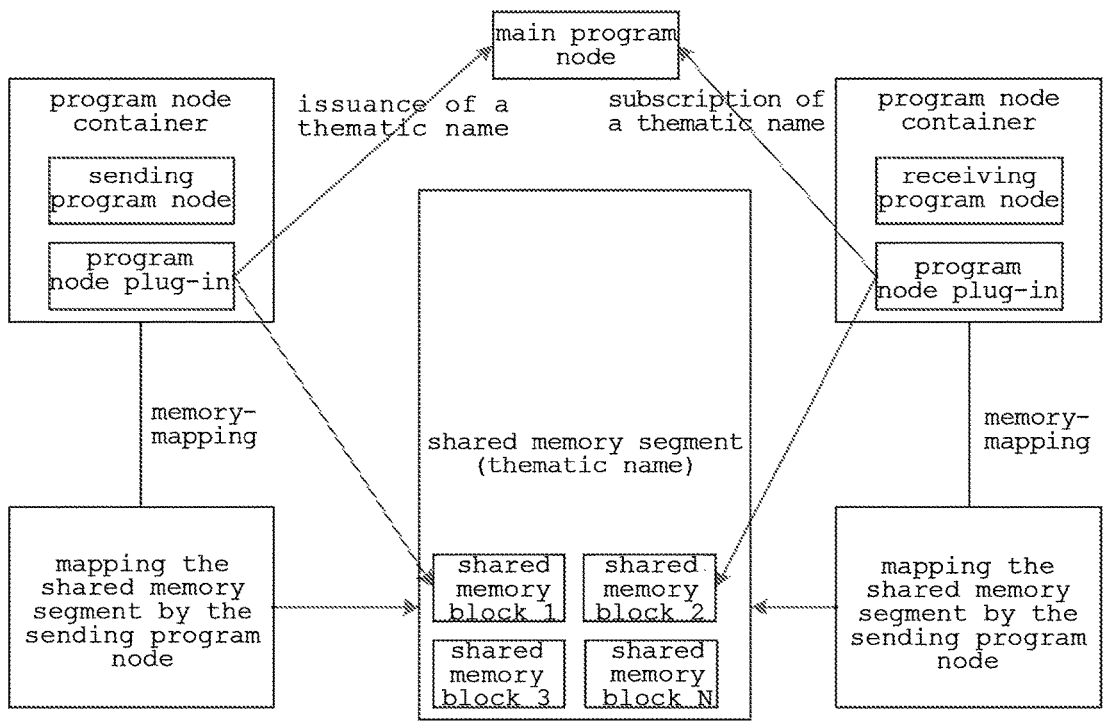
FIG. 3 illustrates an exemplary schematic diagram of a data transmission method according to an embodiment of the present application.

Referring to FIG. 3, a schematic diagram of a data transmission method according to an embodiment of the present application is shown.

A main program node, a shared memory segment, a sending program node and a receiving program node are shown in FIG. 3. The shared memory segment may correspond a thematic name in an one-to-one correspondence. For any thematic name, it is possible to apply for a shared memory segment corresponding to the thematic name dynamically. Data may be transmitted between the sending program node and the receiving program node though the shared memory segment corresponding to the thematic name.

Each program node has a separate running space, which may be referred as a program node container. Each of the program nodes runs in a program node container respectively, maintenances its own member variables and member methods. The resources used during data transmission are transparent to other program nodes in requesting and using the resources until the resources are released.

The sending program node may issue the thematic name, and the receiving program node may subscribe for the thematic name. The issuance and subscription of the thematic name may be accomplished by the main program node, establishing the corresponding relationship between the sending program node for issuing the thematic name and the receiving program node for subscribing the thematic name.

The sending program node may create a shared memory segment which is used for transmitting data between itself and the data receiving process. Then, the shared memory segment and the thematic name may be bounded. The sending program node may write, according to the issued thematic name, the data into the shared memory segment corresponding to the issued thematic name. The receiving program node may read, according to the subscribed thematic name, the data from the shared memory segment corresponding to the subscribed thematic name.

After the sending and receiving program nodes find, according to the issued or subscribed thematic name, the shared memory segment corresponding to the dynamically allocated thematic name, they need to memory-map the data in the memory in their respective isolated resources pool first, so as to enable them to write/read data into/from this shared memory segment, which ensures the resource isolation and the data security. When data transmission is done or the system becomes abnormal, the sending program node and the receiving program node will release the shared memory segment which was mapped previously in order to recycle the invalid shared memory segment in time and effectively.

The shared memory segment may provide interfaces for writing and reading the data. After the sending program node and the receiving program node mounts the shared memory segment according to the thematic name, they may directly call the corresponding interface without consideration of specific details, to write/read data into/from the shared memory segment.

When the sending program node and the receiving program node write or read the data into or from the shared memory segment, the data is written into the shared memory block or read from the shared memory block. The shared memory block may correspond, in one-to-one correspondence, to the data transmitted by a program node. The data type of the data stored in the shared memory block may be a predefined data type or a data type defined by the user. The shared memory block may be used for recording the number of the program nodes that are writing data and the number of the program nodes that are reading data, and automatically modifying the corresponding numerical value after writing data or reading data is done.

In order to manage and operate each shared memory block of the shared memory segment, one memory area may be settled in the shared memory segment to store the basic information on the shared memory segment and the information on each shared memory block. The basic information on the shared memory segment may include the thematic name, an index of the shared memory segment, or the like. In addition, the basic information on each shared memory block may also be stored in the shared memory segment so that the sending program node and the receiving program node may effectively address the data, and then write or read the data in order, wherein the basic information on these shared memory blocks includes the serial numbers of the shared memory blocks, the current status of reading and writing, or the like.

An operation interface of the shared memory segment may be presetted to operate the shared memory segment, and the interface may be loaded into the sending program node and the receiving program node in a form of plug-in. Accordingly, this operation interface may be also refereed as a program node plug-in. The sending program node and the receiving program node may use this program node plug-in to accomplish the memory-mapping and to write/read the date into/from the shared memory segment. According to the size and requirements of the amount of the to-be-transmitted data, each program node may freely select a communication mechanism based on the shared memory, or use other transmission schemes. Thus, a simple migration scheme is provided to the program nodes to transmit the data therebetween by using the communication mechanism based on the shared memory.

Figure 4:
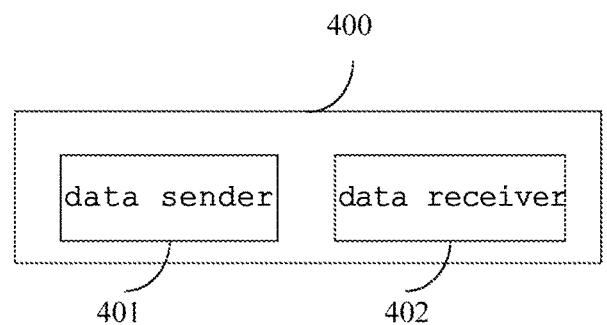
FIG. 4 illustrates a structural schematic diagram of a data transmission system according to an embodiment of the present application.

Referring to FIG. 4, the present application provides an embodiment of a data transmission system for implementing the method illustrated in the above figures. To be specific, this embodiment is corresponding to the embodiment of method illustrated in FIG. 2.

As shown in FIG. 4, the data transmission system 400 in the present embodiment includes a data sender 401 and a data receiver 402, wherein, the data sender 401 is used for: receiving a data transmission-instruction including a thematic name indicative of the type of the to-be-transmitted data required by the data receiver; creating a shared memory segment corresponding to the thematic name so that the data sender and the data receiver may transmit the to-be-transmitted data by using the shared memory segment.

In some optional implementations of the present embodiment, the data sender 401 is implemented as a data sending process, and the data receiver 402 is implemented as a data receiving process. The data transmission system 400 further includes a main process which is used for: receiving a issuance request sent by the data sending process, wherein the issuance request includes a thematic name; storing the thematic name and the identity of the data sending process correspondingly.

In some optional implementations of the present embodiment, the main process is further used for: receiving a subscription request sent by the data receiving process, wherein the subscription request includes a thematic name; storing the thematic name and the identity of the data receiving process correspondingly; establishing a corresponding relationship between the data sending process and data receiving process; and sending a data transmission-instruction to the data sending process.

In some optional implementations of the present embodiment, the data sending process is further used for calling a presetted operation interface of the shared memory segment to write the to-be-transmitted data into the shared memory segment. The data receiving process is further used for calling the presetted operation interface of the shared memory segment to read the to-be-transmitted data from the shared memory segment.

In some optional implementations of the present embodiment, the data transmission system 400 further includes a storage unit (not shown), which is used for storing attribute information in the storage space corresponding to the shared memory segment, wherein the attribute information includes the thematic name, and the index of the shared memory block in the shared memory segment.

In some optional implementations of the present embodiment, the data sending process is further used for mapping the shared memory segment in the storage space corresponding to the data sending process after the shared memory segment corresponding to the thematic name is created. The data receiving process is further used for mapping the shared memory segment in the storage space corresponding to the data receiving process after the shared memory segment corresponding to the thematic name is created.

In some optional implementations of the present embodiment, the data transmission system 400 further includes a detecting unit (not shown), which is used for detecting whether the transmission of the to-be-transmitted data by the data sending process and the data receiving process is done or appears abnormal; sending a releasing instruction to the data sending process and the data receiving process when the transmission of the to-be-transmitted data is done or appears abnormal, so that the data sending process and the data receiving process release the shared memory segment.

Figure 5:
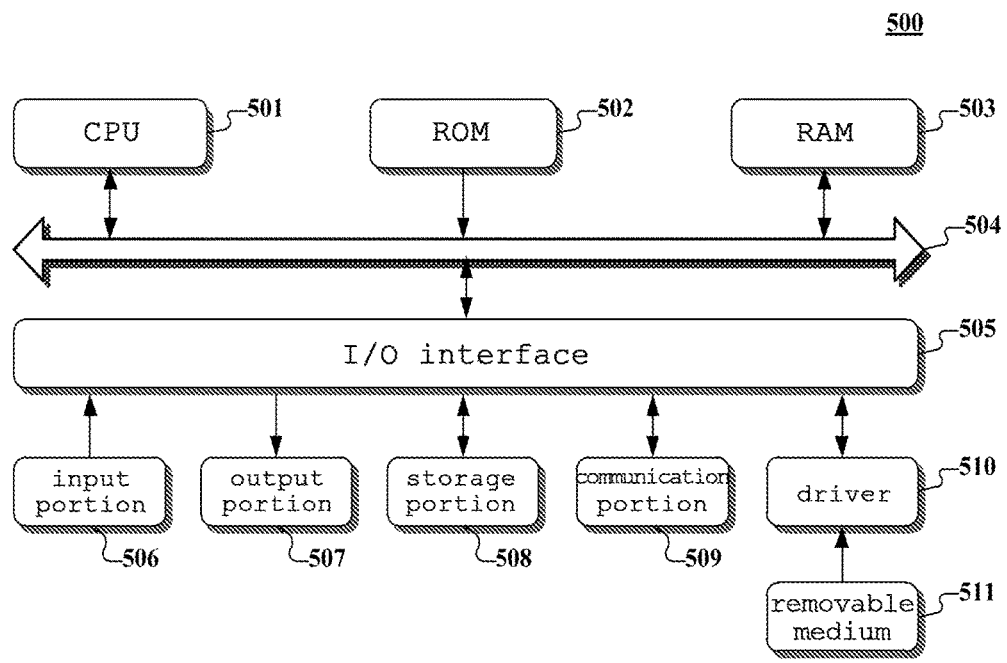
FIG. 5 illustrates a structural schematic diagram of a computer system adapted to implement a data transmission system according to an embodiment of the present application.

FIG. 5 illustrates a schematic structural diagram of a computer system 500 adapted to implement a data transmission system according to the embodiments of the present application.

As shown in FIG. 5, the computer system 500 includes a central processing unit (CPU) 501, which may execute various appropriate actions and processes in accordance with the programs stored in a read-only memory (ROM) 502 or the programs loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD) and a speaker etc.; a storage portion 508 including a hard disk and the like; and a communication portion 509 comprising a network interface card, such as a LAN card and a modem. The communication portion 509 performs communication processings via a network, such as the Internet. A driver 510 is also connected to the I/O interface 505 as required. A removable medium 511, such as a magnetic disk, an optical disk, a magneto-optical disk, a semiconductor memory and the like, may be installed on the driver 510 as required, to facilitate the retrieval of a computer program from the removable medium 511, and the installation thereof on the storage portion 508 as needed.

In particular, according to an embodiment of the present disclosure, the procedure described above with reference to the flowchart may be implemented in a computer software program. For example, an embodiment of the present disclosure includes a computer program product, which comprises a computer program that is tangibly embedded in a machine-readable medium. The computer program comprises program codes for executing the method of the flowchart. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each box in the flowcharts and block diagrams may represent a module, a program segment, or a code portion. The module, the program segment, or the code portion comprises one or more executable instructions for implementing the specified logical function. It should also be noted that, in some alternative implementations, the functions denoted by the blocks may appear in a sequence different from the sequences shown in the figures. For example, in practice, two blocks in succession may be executed, depending on the involved functionalities, substantially in parallel, or sometimes in a reverse sequence. It should also be noted that, each block in the block diagrams and/or the flow charts, and a combination thereof may be implemented by a dedicated hardware-based system executing specific functions or operations, or by a combination of a dedicated hardware and computer instructions.

In another aspect, the present application further provides a non-volatile computer storage medium. The non-volatile computer storage medium may be the non-volatile computer storage medium included in the devices in the above embodiments, or a stand-alone non-volatile computer storage medium which has not been assembled into the devices. The said non-volatile computer storage medium stores one or more programs, when the said one or more programs is(are) executed by one device, the device performs the following steps: a data sender receives a data transmission-instruction including a thematic name indicative of the type of to-be-transmitted data which is required by a data receiver; a data sender creates a shared memory segment corresponding to the thematic name, so that the data sender and the data receiver may transmit the to-be-transmitted data by using the shared memory segment.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to execute the method described in the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data transmission method, comprising:
    receiving, by a computer processor, a subscription request sent by a data receiver, wherein the subscription request includes a thematic name;
    storing the thematic name and an identity of the data receiver correspondingly;
    establishing a corresponding relationship between a data sender and the data receiver;
    sending a data transmission-instruction to the data sender;
    receiving, by the data sender, the data transmission-instruction, the received instruction includes the thematic name indicative of a type of to-be-transmitted data required by the data receiver; and
    creating a shared memory segment corresponding to the thematic name so that the data sender and the data receiver transmit the to-be-transmitted data through the shared memory segment.

2. The method according to claim 1, wherein the data sender is of a data sending process and the data receiver is of a data receiving process, and the method further comprises:
    receiving, by the computer processor, an issuance request sent by the data sending process, wherein the issuance request includes the thematic name; and
    storing the thematic name and an identity of the data sending process correspondingly.

3. The method according to claim 1, wherein, after the shared memory segment corresponding to the thematic name is created, the method further comprises:
    calling, by the data sending process, a preset operation interface of the shared memory segment to write the to-be-transmitted data into the shared memory segment; and
    calling, by the data receiving process, the preset operation interface of the shared memory segment to read the to-be-transmitted data.

4. The method according to claim 3, wherein, the method farther comprises:
    storing, in a storage space corresponding to the shared memory segment, the attribute information including the thematic name, and an index of a shared memory block in the shared memory segment.

5. The method according to claim 4, wherein, after the shared memory segment corresponding to the thematic name is created, the method, farther comprises:
    memory-mapping, by the data sending process and the data receiving process, the shared memory segment to a corresponding storage space.

6. The method according to claim 5, wherein, the method further comprises:
    detecting if a transmission of the data transmitted by the data sending process and data receiving process is done or appears abnormal;
    if yes, sending a releasing instruction to the data sending process and the data receiving process, so that the data sending process and data receiving process release the shared memory segment.

7. A data transmission system, wherein, the system comprises a computer processor, a data sender and a data receiver,
    wherein the computer processor receives a subscription request sent by the data receiver, wherein the subscription request includes a thematic name, stores the thematic name and an identity of the data receiver correspondingly, establishes a corresponding relationship between the data sender and the data receiver, and sends a data transmission-instruction to the data sender; the data sender receives the data transmission-instruction including the thematic name indicative of a type of to-be-transmitted data required by the data receiver, and creates a shared memory segment corresponding to the thematic name so that the data sender and the data receiver transmit the to-be-transmitted data through the shared memory segment.

8. The system according to claim 7, wherein, the data sender is of a data sending process and the data receiver is of a data receiving process,
wherein the computer processor receives an issuance request sent by the data sending process, wherein the issuance request includes the thematic name; and stores the thematic name and an identity of the data sending process correspondingly.

9. The system according to claim 7, wherein, the data sending process is further used to call a presetted operation interface of the shared memory segment to write the to-be-transmitted data into the shared memory segment; and
the data receiving process is further used to call a presetted operation interface of the shared memory segment to read the to-be-transmitted data.

10. The system according to claim 9, wherein, the system further comprises:
a storage unit storing, in a storage space corresponding to the shared memory segment, attribute information including the thematic name and an index of a shared memory block in the shared memory segment.

11. The system according to claim 10, wherein, the data sending process is further used to map the shared memory segment corresponding to the thematic name in a storage space corresponding to the data sending process after the shared memory segment is created;
the data receiving process is further used to map the shared memory segment corresponding to the thematic name in a storage space corresponding to the data receiving process after the shared memory segment is created.

12. The system according to claim 11, wherein, the system further comprises:
a detecting unit detects if a transmission of the to-be-transmitted data by the data sending process and the data receiving process is done or appears abnormal;
if so, the detecting unit sends a releasing instruction to the data sending process and the data receiving process so that the data sending process and the data receiving process release the shared memory segment.

13. A non-transitory storage medium storing one or more programs, the one or more programs when executed by an apparatus, causing the apparatus to perform a data transmission method, comprising:
receiving, by a computer processor, a subscription request sent by a data receiver, wherein the subscription request includes a thematic name;
storing the thematic name and an identity of the data receiver correspondingly;
establishing a corresponding relationship between a data sender and the data receiver;
sending a data transmission-instruction to the data sender;
receiving, by the data sender, the data transmission-instruction, the received instruction includes the thematic name indicative of a type of to-be-transmitted data required by the data receiver; and
creating a shared memory segment corresponding to the thematic name so that the data sender and the data receiver transmit the to-be-transmitted data through the shared memory segment.

* * * * *